US009697695B2

(12) United States Patent
Shechtman

(10) Patent No.: US 9,697,695 B2
(45) Date of Patent: Jul. 4, 2017

(54) ENHANCED PARIMUTUEL WAGERING FILTER

(75) Inventor: Scott Shechtman, New York, NY (US)

(73) Assignee: Longitude LLC, New York, NY (US)

( * ) Notice: Subject to any disclaimer, the term of this patent is extended or adjusted under 35 U.S.C. 154(b) by 200 days.

(21) Appl. No.: 13/161,186

(22) Filed: Jun. 15, 2011

(65) Prior Publication Data

US 2012/0322540 A1 Dec. 20, 2012

(51) Int. Cl.
*A63F 13/00* (2014.01)
*G07F 17/32* (2006.01)

(52) U.S. Cl.
CPC ................................ *G07F 17/3288* (2013.01)

(58) Field of Classification Search
CPC .................................................. G07F 17/3288
USPC ..................................................... 463/20, 25
See application file for complete search history.

(56) References Cited

U.S. PATENT DOCUMENTS

| | | | |
|---|---|---|---|
| 4,903,201 | A | 2/1990 | Wagner |
| 5,101,353 | A | 3/1992 | Lupien et al. |
| 5,148,365 | A | 9/1992 | Dembo |
| 5,220,500 | A | 6/1993 | Baird et al. |
| 5,275,400 | A | 1/1994 | Weingardt et al. |
| 5,313,560 | A | 5/1994 | Maruoka et al. |
| 5,524,187 | A | 6/1996 | Feiner et al. |
| 5,564,701 | A | 10/1996 | Dettor |
| 5,573,244 | A | 11/1996 | Mindes |
| 5,608,620 | A | 3/1997 | Lundgren |
| 5,672,106 | A | 9/1997 | Orford et al. |
| 5,749,785 | A | 5/1998 | Rossides |
| 5,794,207 | A | 8/1998 | Walker et al. |
| 5,799,287 | A | 8/1998 | Dembo |
| 5,806,048 | A | 9/1998 | Kiron et al. |
| 5,819,237 | A | 10/1998 | Garman |
| 5,842,921 | A | 12/1998 | Mindes et al. |
| 5,845,266 | A | 12/1998 | Lupien et al. |
| 5,873,782 | A | 2/1999 | Hall |

(Continued)

FOREIGN PATENT DOCUMENTS

| | | |
|---|---|---|
| JP | 64-019496 U | 1/1989 |
| JP | 11-501423 | 2/1999 |

(Continued)

OTHER PUBLICATIONS

Shin, H., "Measuring the Incidence of Insider Trading in a Market for State-Contingent Claims," The Economic Journal, Sep. 1993, pp. 1141-1153, vol. 103, No. 420, Royal Economic Society.

(Continued)

*Primary Examiner* — Kang Hu
*Assistant Examiner* — Thomas H Henry
(74) *Attorney, Agent, or Firm* — Nixon & Vanderhye P.C.

(57) ABSTRACT

A wagering system and method may include a processor that filters bet types available for placement of a bet by a user according to user-input betting criteria, and that presents the filtered bet types that satisfy the criteria in a user interface via which the user may place a bet of one of the presented bet types. The user may input particular criteria to customize the available results of the bet filter as desired. The system may output an identification of a surest bet. The system may provide a slider control for input of a desired payout amount or odds, or range thereof, as criteria according to which the system filters bet types.

23 Claims, 6 Drawing Sheets

(56) References Cited

U.S. PATENT DOCUMENTS

| | | | |
|---|---|---|---|
| 5,911,136 A | 6/1999 | Atkins | |
| 5,970,479 A | 10/1999 | Shepherd | |
| 6,061,662 A | 5/2000 | Makivic | |
| 6,078,904 A | 6/2000 | Rebane | |
| 6,085,175 A | 7/2000 | Gugel et al. | |
| 6,115,697 A | 9/2000 | Gottstein | |
| 6,134,536 A | 10/2000 | Shepherd | |
| 6,247,000 B1 | 6/2001 | Hawkins et al. | |
| 6,263,321 B1 | 7/2001 | Daughtery, III | |
| 6,278,981 B1 | 8/2001 | Dembo et al. | |
| 6,317,728 B1 | 11/2001 | Kane | |
| 6,321,212 B1 | 11/2001 | Lange | |
| 6,336,103 B1 | 1/2002 | Baker | |
| 6,358,150 B1 | 3/2002 | Mir et al. | |
| 6,370,516 B1 | 4/2002 | Reese | |
| 6,379,248 B1 | 4/2002 | Jorasch et al. | |
| 6,394,895 B1 | 5/2002 | Mino | |
| 6,408,282 B1 | 6/2002 | Buist | |
| 6,418,417 B1 | 7/2002 | Corby et al. | |
| 6,418,419 B1 | 7/2002 | Nieboer et al. | |
| 6,443,838 B1 | 9/2002 | Jaimet | |
| 6,456,982 B1 | 9/2002 | Pilipovic | |
| 6,468,156 B1 | 10/2002 | Hughs-Baird et al. | |
| 6,554,708 B1 | 4/2003 | Brenner et al. | |
| 6,554,709 B1 | 4/2003 | Brenner et al. | |
| 6,594,643 B1 | 7/2003 | Freeny, Jr. | |
| 6,601,044 B1 | 7/2003 | Wallman | |
| 6,712,701 B1 | 3/2004 | Boylan, III et al. | |
| 7,020,632 B1 | 3/2006 | Kohls et al. | |
| 7,047,217 B1 | 5/2006 | Gottstein | |
| 7,172,508 B2 | 2/2007 | Simon et al. | |
| 7,742,972 B2 | 6/2010 | Lange et al. | |
| 8,099,182 B1 | 1/2012 | Kasten | |
| 8,118,675 B2 | 2/2012 | Horowitz et al. | |
| 8,131,620 B1 | 3/2012 | Steinberg et al. | |
| 2001/0044767 A1 | 11/2001 | Madoff et al. | |
| 2001/0047291 A1* | 11/2001 | Garahi et al. | 705/10 |
| 2001/0051540 A1 | 12/2001 | Hindman et al. | |
| 2002/0032644 A1 | 3/2002 | Corby et al. | |
| 2002/0052819 A1 | 5/2002 | Burton | |
| 2002/0073018 A1 | 6/2002 | Mulinder et al. | |
| 2002/0077712 A1* | 6/2002 | Safaei et al. | 700/93 |
| 2002/0123954 A1 | 9/2002 | Hito | |
| 2003/0199315 A1 | 10/2003 | Downes | |
| 2004/0005926 A1 | 1/2004 | LeFroy | |
| 2004/0006528 A1 | 1/2004 | Kevin Fung | |
| 2004/0006529 A1 | 1/2004 | Fung | |
| 2004/0006534 A1 | 1/2004 | Fung | |
| 2004/0039670 A1 | 2/2004 | Fung | |
| 2004/0043810 A1 | 3/2004 | Perlin et al. | |
| 2004/0048656 A1 | 3/2004 | Krynicky | |
| 2004/0054617 A1 | 3/2004 | Fung | |
| 2004/0153375 A1 | 8/2004 | Mukunya et al. | |
| 2005/0086143 A1 | 4/2005 | Vlazny et al. | |
| 2005/0125341 A1 | 6/2005 | Miri et al. | |
| 2006/0112099 A1 | 5/2006 | Musgrove et al. | |
| 2006/0183548 A1 | 8/2006 | Morris et al. | |
| 2007/0022025 A1 | 1/2007 | Litman et al. | |
| 2007/0192312 A1 | 8/2007 | Carnahan et al. | |
| 2008/0058043 A1 | 3/2008 | Amaitis et al. | |
| 2008/0066111 A1 | 3/2008 | Ellis et al. | |
| 2008/0086223 A1 | 4/2008 | Pagliarulo | |
| 2008/0140477 A1 | 6/2008 | Tevanian et al. | |
| 2008/0248850 A1 | 10/2008 | Schugar | |
| 2008/0274815 A1 | 11/2008 | Root | |
| 2009/0259566 A1 | 10/2009 | White, III et al. | |
| 2010/0041470 A1 | 2/2010 | Preisach | |
| 2010/0041482 A1 | 2/2010 | Kumar et al. | |
| 2010/0075729 A1 | 3/2010 | Allen et al. | |
| 2010/0094863 A1 | 4/2010 | Kenton-Dau et al. | |
| 2010/0100204 A1 | 4/2010 | Ng et al. | |
| 2010/0144428 A1 | 6/2010 | Fontaine et al. | |
| 2010/0256789 A1 | 10/2010 | Miller | |
| 2010/0261521 A1* | 10/2010 | Oatman et al. | 463/25 |
| 2011/0035400 A1 | 2/2011 | Nishida et al. | |
| 2011/0065490 A1* | 3/2011 | Lutnick | 463/16 |
| 2011/0098093 A1 | 4/2011 | Amaitis et al. | |
| 2011/0112891 A1 | 5/2011 | Alber et al. | |
| 2011/0184783 A1 | 7/2011 | Roman Stoica et al. | |
| 2011/0191138 A1 | 8/2011 | Saraf | |
| 2012/0009984 A1 | 1/2012 | Amaitis et al. | |
| 2012/0149472 A1 | 6/2012 | Miller | |

FOREIGN PATENT DOCUMENTS

| | | |
|---|---|---|
| WO | 9618162 A1 | 6/1996 |
| WO | 0008567 A1 | 2/2000 |
| WO | 0108063 A1 | 2/2001 |
| WO | WO-0191872 A1 | 12/2001 |

OTHER PUBLICATIONS

Shin, H., "Optimal Betting Odds Against Insider Traders," The Economic Journal, Sep. 1991, pp. 1179-1185, vol. 101, Issue 408, Royal Economic Society.

Smith,T.R., "A Statistical Model for Characterizing Price Variability with Application to Dairy Investment Analysis," 1980, pp. 1-2.

Smithson, C.W., Managing Financial Risk: A Guide to Derivative Products, Financial Engineering and Value Maximization, Third Edition, McGraw-Hill Professional, 1998, pp. 34-38, 270-271 and 305-306.

Takahiro, W., "A Parimutuel System with Two Horses and a Continuum of Bettors," Journal of Mathematical Economics 28, pp. 85-100, 1997.

University of Iowa's Iowa Electronic Market (IEM) Trader's Manual, Aug. 1995, pp. 1-51, via http://web.archive.org/web/19970506020832/www.biz.uiowa.edu/iem/trman.txt.

U.S. Appl. No. 60/389,956, filed Jun. 20, 2002, application, including specification and drawings.

U.S. Appl. No. 60/442,462, filed Jan. 25, 2003, application, including specification, claims and abstract.

Watanabe, T., et al., 1994, "A Model of a General Parimutuel System: Characterizations and Equilibrium Selection," International Journal of Game Theory 23, pp. 237-260.

Weigel, E., "SuperUnits and SuperShares," Interfaces, May-Jun. 1994, pp. 62-79, vol. 24, No. 3, The Institute of Management Sciences.

Williams, L., "Information Efficiency in Betting Markets: A Survey," Bulletin of Economic Research, 1999, pp. 1-30, vol. 51, No. 1, Blackwell Publishers, Malden, MA.

Ainslie, T., Ainslie's Complete Hoyle, 1975, Barnes and Noble Books by Simon and Schuster, Inc., p. 251.

Athanasoulis, S., et al., Macro Markets and Financial Security, FRBNY Economic Policy Review, Apr. 1999, pp. 21-39.

Bahra, B., "Implied Risk-Neutral Probability Density Functions From Option Prices: Theory and Application," Bank of England, 1997, ISSN 1368-5562.

Baron, K., et al., "From Horses to Hedging," Risk Magazine, Feb. 2003, pp. 73-77, vol. 16, No. 2, Risk Waters Group, Ltd., United Kingdom.

Billingsley, P., Probability and Measure, 1986, Second Edition, John Wiley and Sons, New York, pp. 16-26.

Bruce, A., et al., "Market Efficiency Analysis Requires a Sensitivity to Market Characteristics: Some Observations on a Recent Study of Betting Market Efficiency," Applied Economics Letters, 2000, pp. 199-202, No. 7, Taylor and Francis Ltd.

Bruce, A., et al., "Investigating the Roots of the Favourite-Longshot Bias: An Analysis of Decision Making by Supply- and Demand-Side Agents in Parallel Betting Markets," Journal of Behavioral Decision Making, 2000, pp. 413-430, vol. 13, Issue No. 4, John Wiley & Sons, Ltd.

Burns, G., "As the U. of Iowa Goes, So Goes the Nation?" Business Week, New York, Nov. 11, 1996, Issue 3501, p. 118.

Burns, G., "The Election Futures Market: More Accurate than Polls?" Nov. 11, 1996, Business Week, 1-3.

Busche, K., et al., "Decision Costs and Betting Market Efficiency," Rationality and Society, 2000, pp. 477-492, vol. 12, No. 4, Sage Publications, Thousand Oaks, CA.

(56) References Cited

OTHER PUBLICATIONS

Cain, M., et al., "The Relationship between Two Indicators of Insider Trading in British Racetrack Betting," Economica, 2001, pp. 97-104, No. 68, The London School of Economics and Political Science.
Cain, M., et al., "The Incidence of Insider Trading in Betting Markets and the Gabriel and Marsden Anomaly," The Manchester School, Mar. 2001, pp. 197-207, vol. 69, No. 2, Blackwell Publishers Ltd., Malden, MA.
Dek, T., et al., "Optimal Betting and Efficiency in Parimutuel Betting Markets with Information Costs," The Economic Journal, Jul. 1996, pp. 846-863, vol. 106, No. 437, Blackwell Publishers, Malden, MA.
Economides, N. et al., "Electronic Call Market Trading," The Journal of Portfolio Management, Spring 1995, pp. 10-18.
Edelman, D.C., et al., "Tote Arbitrage and Lock Opportunities in Racetrack Betting," Working Paper, Oct. 17, 2001, pp. 1-8, Department of Accounting and Finance, University of Wollongong, Australia.
Eisenberg, E., "Consensus of Subjective Probabilities: The Pari-Mutuel Method," Annals of Mathematical Statistics, Mar. 1959, pp. 165-168, vol. 30, No. 1, Institute of Mathematical Statistics.
Evans, M., et al., Statistical Distributions, Second Edition, John Wiley & Sons, Inc., New York, pp. 140-141, 1993.
Fingleton, J., et al., "Optimal Determination of Bookmakers' Betting Odds: Theory and Tests," Jun. 1, 2001, pp. 1-36, Technical Paper No. 96/9, Trinity College, Dublin, Ireland.
Garbade, K. et al., 1979, "Structural Organization of Secondary Markets: Clearing Frequency, Dealer Activity, and Liquidity Risk," The Journal of Finance, vol. 34, No. 3, pp. 577-593.
Gu, S., et al., "Exchange Market Model for Over-the-Counter Equity Derivatives Trading," Working Paper, Oct. 9, 2001, pp. 1-29, Center for Research on Electronic Commerce, The University of Texas at Austin.
Hakansson, N., "Welfare Aspects of Options and Supershares," The Journal of Finance, Jun. 1978, pp. 759-776, vol. 33, No. 3.
Hanson, R., "Logarithmic Market Scoring Rules for Modular Combinatorial Information Aggregation," Working Paper, Jan. 2002, pp. 1-12, Department of Economics, George Mason University.
Haug, E.G., The Complete Guide to Options Pricing Formulas, 1998, McGraw-Hill, N.Y. p. 1.
Hausch, D., et al., Efficiency of Racetrack Betting Markets, 1994, Academic Press Inc., San Diego, CA.
Helenius, T., "Real Bonds, Real-time, Real Fast," Wall Street & Technology, New York, Apr. 1998, vol. 16, Issue 4, pp. 62-66.
Hong, S., "Japanese Investment Posts Strong Momentum," China Daily, New York, NY, Feb. 15, 1997, pp. "3-1" to "3-2".
Hurley, W.J., Winter 1998, "On the Use of Martingales in Monte Carlo Approaches to Multiperiod Parameter Uncertainty in Capital Investment Risk Analysis," The Engineering Economist, vol. 43, No. 2, pp. 169-182.
Ingersoll, J., Jr., "Digital Contracts: Simple Tools for Pricing Complex Derivatives," Journal of Business, 2000, pp. 67-88, vol. 73, No. 1, The University of Chicago, Chicago, IL.
Johnson, J., "An Empirical Study of the Impact of Complexity on Participation in Horserace Betting," Journal of Gambling Studies, Summer 1997, pp. 159-172, vol. 13, No. 2, Human Sciences Press, Inc.
Karp, J., "River Runs Dry: Big Hongkong Property Deal Falls Through," Far Eastern Economic Review, Hong Kong, Nov. 12, 1992, vol. 155, Issue 45, Starts on p. 69.
Lack of Debt Trades Stunts Market—HSBC, Businessworld, Manila, Sep. 22, 1998, pp. 1-2.
Lange, L., et al., "A Parimutuel Market Microstructure for Contingent Claims Trading," Working Paper, Nov. 21, 2001, pp. 1-47, Stern School of Business, New York University, New York, NY.
Madhavan, A., "Trading Mechanisms in Securities Market," The Journal of Finance, 1992, vol. 47, No. 2, pp. 607-641.
Merton, R., "Continuous-Time Finance," Basil Blackwell, Inc., 1990, Cambridge, Massachusetts, pp. 441-457.
Mintz, S.L., "Measuring up: What CEOs Look for in their Chief Financial Officers," CFO, Boston, MA, Feb. 1994, vol. 10, Issue 2, pp. 28-32.
Narsing, A., et al., "Constrained Moments Simulation of Healthcare Capital Acquisitions," IEEE, 1997, New York, NY, USA, Portland International Conference on Management of Engineering Technology, p. 768.
Owen, G., "Parimutuel as a System of Aggregation of Information," Game Theoretical Applications to Economics and Operations Research, 1997, pp. 183-195, Kluwer Academic Publishers, The Netherlands.
Pagano, M., et al., Jun. 1996, "Transparency and Liquidity: A Comparison of Auction and Dealer Markets with Informed Trading," The Journal of Finance, vol. 51, No. 2, pp. 579-611.
Parker, K., Derivatives Offer Opportunity for the Small-Time Trader, The Vancouver Sun, Vancouver, B.C.: Apr. 10, 1995, pp. 1-2.
Pedersen, C.S., "Derivatives and Downside Risk," Derivatives Use, Trading & Regulation, 2001, pp. 251-268, vol. 7, No. 3, London.
Peel, D., et al., "Product Bundling and a Rule of Thumb versus the Harville Formulae: Can Each Way Bets with UK Bookmakers Generate Abnormal Returns," Applied Economics, 2000, pp. 1737-1744, No. 32, Taylor & Francis Ltd.
Phatarfod, R., "Betting Strategies in Horse Races," Asia-Pacific Journal of Operational Research, 1999, pp. 87-98, No. 16.
Plott, C.R., et al., "Parimutuel Betting Markets As Information Aggregation Devices: Experimental Results," Caltech Social Science Working Paper 986, Apr. 1997, pp. 1-58.
Randhawa, S.U., et al., "Financial Risk Analysis Using Financial Risk Simulation Prog," Industrial Management, Norcross, Sep./Oct. 1993, vol. 35, Issue 5, pp. 24-27.
Rhoda, K., et al., "Risk Preferences and Information Flows in Racetrack Betting Markets," The Journal of Financial Research, Fall 1999, pp. 265-285, vol. 22, No. 3.
Rubinstein, M., "Supershares," Handbook of Equity Derivatives, 1994, pp. 1-14, Irwin.
Saatcioglu, K., et al., "Design of a Financial Portal," Communications of the ACM, Jun. 2001, pp. 33-38, vol. 44, No. 6.
Schnitzlein, C., "Call and Continuous Trading Mechanisms Under Asymmetric Information: An Experimental Investigation," The Journal of Finance, Jun. 1996, vol. 51, No. 2, pp. 613-636.
Schwartz, R.A., "Integrating Call and Continuous Markets," Securities Traders' Monthly, Sep. 1991, pp. 14-16.
Shapley, L., et al., 1977, Trade Using One Commodity as a Means of Payment, Journal of Political Economy, vol. 85, No. 1, pp. 937-968.
International Search Report dated Dec. 5, 2012 issued in corresponding PCT Application No. PCT/US12/042596.
Abraham Silberschatz and Peter B. Galvin, Operating System Concepts, 1994, Addison-Wesley Publishing Company, Inc., 4th edition, p. 20.
Kenneth Strong, Place Betting, Oct. 28, 2007, www.predictem.com/horse/place.php, 2 pages.
Chambers 21st Century Dictionary, 2001, Chambers, trifecta definition, 2 pages.
Jim Johnson, Betting Field Horses in the Derby, May 3, 2009, en.allexperts.com, http://en.allexperts.com/q/Horse-Racing-2248/2009/5/Betting-Field-Horses-Derby.htm, 2 pages.
Allen Moody, How to bet on Golf, Mar. 17, 2013, about.com, http://sportsgambling.about.com/od/bettingonothersports/a/golf.htm, 1 page.
University of Iowa's Iowa Electronic Market (IEM) Trader's Manual, May 6, 1997; pp. 1-51, via http://web.archive.org/web/19970506020832/mm.biz.uiowa.edu/iem/trman.txt.
"As the U. of Iowa Goes, So Goes the Nation?," Greg Burns, Business Week, New York, Nov. 11, 1996, Issue 3501, 2 pages.
"Derivatives offer opportunity for the small-time trader," Kent Parker, The Vancouver Sun, Vancouver, B.C.: Apr. 10, 1995, 3 pages.
International Preliminary Report on Patentability in International Application No. PCT/US2012/042596, dated Jan. 3, 2014 , 7 pages.

(56) References Cited

OTHER PUBLICATIONS

European Search Report dated Jan. 26, 2015 issued in European Application No. 10 85 3029.

* cited by examiner

ENHANCED PARIMUTUEL WAGERING FILTER

RELATED APPLICATIONS

This application is related to U.S. patent application Ser. No. 10/640,656, filed on Aug. 13, 2003, now U.S. Pat. No. 7,742,972, U.S. patent application Ser. No. 12/905,558, filed on Oct. 15, 2010, and U.S. Provisional Patent Application Ser. No. 61/353,712, filed Jun. 11, 2010, each of which is incorporated herein by reference in its entirety.

FIELD OF THE INVENTION

The present invention relates to a filter developed to allow for simplified wagering on events, for example, which have no underlying cash market.

BACKGROUND INFORMATION

In parimutuel betting systems, unlike other win/lose wagering systems, such as fixed-odd betting, a payout on a bet is not determined until a pool is closed, which typically occurs when or shortly before the event on which bets are placed begins. Parimutuel betting systems are designed around shifting odds that continually change until a final bet on the event is placed. Each payout for each individual bet is determined as a share of all the available bet amounts in the pool. A winning wager in a parimutuel system receives a payout from the portion of the pool that is made available to pay winning wagers (as opposed to portions kept by operators ("the house")), which payout is proportional to the ratio of the amount of money wagered by the individual to the available portions of the overall amount wagered by the winning bets.

In parimutuel betting systems, the role of and risk to the house, which may be, for example, a casino, sportsbook organization, racetrack operator, or the like, is minimized because bettors are placing wagers against other bettors, rather than against the house. Thus, parimutuel systems may eliminate any tangible risk for the house, allowing the house to simply take a cut of the entire betting pool without regard to the outcome of the event, such as an athletic competition, on which the wagers are placed.

In the past, parimutuel betting systems have received bets by presenting the bettor with a list of possible bets, i.e., event outcomes, for selection. Once selected, the parimutuel betting system receives the selected bet, along with the amount of the bet. A parimutuel betting system may, for example, present a bettor with a list of horses participating in a race, and allow the bettor to select a horse to win.

Parimutuel betting systems may accept wagers of a wide variety of types and on a wide variety of events. As described in U.S. patent application Ser. No. 10/640,656 ("the '656 application"), and U.S. patent application Ser. No. 12/905,558 ("the '558 application"), each incorporated herein by reference, parimutuel wagering systems may accept wagers on events such as horse races or football games. Further, within each event upon which a wager is placed, a wide variety of wagers may be made available. As an example, the '656 application describes a number of ways to bet on a horse race, including, but not limited to, betting on a horse to finish in a particular place in the race, or betting on a horse to finish in any place except for a particular place in the race. A bettor can bet on any possible combination of finishes in a horse race, covering all possible results.

Accordingly, there exists a wide variety of possible bets that may be placed on a wide variety of underlying events.

SUMMARY OF THE INVENTION

Given the wide variety of possible bets that may be placed on a wide variety of underlying events, the inventors of the present invention have discovered that it is often difficult for a prospective bettor to identify the bets best suited to the prospective bettor's wagering strategy. Therefore, example embodiments of the present invention provide for categorizing and characterizing the bets provided by a parimutuel wagering system, and providing a user of the parimutuel wagering system with a user interface that facilitates identification of bets tailored to the user's wagering interests.

According to an example embodiment of the present invention, a computer-implemented wagering method includes at least one computer processor performing the following, e.g., before the end of a betting period in which bets are recordable on an event: receiving user-input betting criteria, determining which of a plurality of possible bet types satisfy the criteria, and outputting an identification of all of the bet types determined to satisfy the criteria. Through this method, a user of the parimutuel wagering system can sort through a large number of possible bet types to find a subset of bet types which meets the user's criteria.

A drawback of parimutuel wagering is the uncertainty of the payout. At the time the bet is made, the bettor does not know the exact odds and the exact payout amount of the bet, since the payout is proportional to the ratio of the amount of money wagered by the individual to the overall amount wagered by the winning bet and further depends on all amounts bet on the relevant event, and the amounts wagered are not final until the end of the betting period. Accordingly, parimutuel wagering systems can offer indicative odds, determined based on the assumption that no more bets will be received during the betting period. The indicative odds are not final as long as the betting period is open, but give the bettor an understanding of the current state of the odds. It is still possible, however, that a bettor will place a bet based on the indicative odds at the time of the bet, only to have the odds change before the end of the betting period. The winning bettor is awarded a payout based on the final odds, and not the indicative odds from the time the bet was placed.

In a further exemplary embodiment of the present invention, the user-input criteria are interpreted as including a reference to indicative odds, where the indicative odds are determined based on an assumption that no more bets will be placed during the betting period. In a further exemplary embodiment of the present invention, the criteria includes minimum indicative odds and/or maximum indicative odds.

In a further exemplary embodiment of the present invention, the event is a sporting event, and the criteria includes the type of sporting event, the league of competitors in which the sporting event is played, or the status of the competitors in the sporting event as professionals in the sporting event.

In a further exemplary embodiment of the present invention, the event is a race, and the criteria includes the type of race. In a further exemplary embodiment of the present invention, the event is a horse race, and the criteria includes the type, e.g., age, gender, or breed, of horses running in the race.

In a further exemplary embodiment of the present invention, the criteria includes the location of the event, or the time at which the event occurs.

In a further exemplary embodiment of the present invention, the criteria are input by interaction with a slider bar, positions on the slider bar defining (a) a minimum of, (b) a maximum of, and/or (c) a range of the criteria, e.g., a score differential in a game, a total score in a game, or a metric such as payout amount or odds.

In a further exemplary embodiment of the present invention, the identification of the bet types is output in a user interface including user-selectable controls for placing bets. In a further exemplary embodiment of the present invention, the user interface is updated in real-time in response to changes in indicative odds, where the indicative odds are determined based on an assumption that no more bets will be placed during the betting period. In a further exemplary embodiment of the present invention, each of the identifications of each bet type is user-selectable for placing a bet of the respectively identified bet type.

In an example embodiment of the present invention, a wagering system comprises at least one computer processor configured to perform the method of receiving user-input betting criteria, determining which of a corpus of bet types satisfy the criteria, and outputting an identification of all of the determined bet types.

In an example embodiment of the present invention, a computer program product for use with a wagering system comprises a computer-usable medium having computer-readable program code embodied in the medium for causing a computer to receive user-input betting criteria, determine which of a corpus of bet types satisfy the criteria, and output an identification of all of the determined bet types.

In an example embodiment of the present invention, the system, using the amount and distribution of bets received, determines and outputs an identification of a surest bet type, i.e., the bet type having the lowest payout per unit of bet. The bet type having the lowest payout is determined to be the surest available bet type because the low payout indicates the greatest agreement among the bettors that bets of the bet type will be winning bets.

According to an exemplary embodiment of the present invention, a computer-implemented wagering method includes performing the following by at least one computer processor, e.g., before the end of a betting period in which bets are recordable on an event: calculating indicative odds of each of a collection of bet types, the indicative odds being based on the assumption that no more bets will be received during the betting period, based on the calculated indicative odds, determining which of the collection of bet types has a lowest payout per unit of bet compared to payouts for others of the collection of bet types, and outputting an identification of the determined bet type as one that has the lowest payout per bet unit.

In a further exemplary embodiment implementing the method, the event is a sporting event, and the collection of bet types includes a plurality of bet types on sporting events played within a league of competitors.

In a further exemplary embodiment, the collection of bet types includes a plurality of bet types on events played on a selected date.

In a further exemplary embodiment, the at least one computer processor outputs the indicative odds of the determined bet type.

In a further exemplary embodiment, the identification of the determined bet type is output via a user interface including a user-selectable control for placing a bet of the determined bet type. In a further exemplary embodiment, the user interface is updated in real-time in response to changes in indicative odds. In a further exemplary embodiment, the identification of the determined bet type is user-selectable for placing a bet of the determined bet type.

In an example embodiment of the present invention, a wagering system comprises at least one computer processor configured to perform the method of obtaining indicative odds of each of a corpus of bet types; based on the obtained indicative odds, determining which of the corpus of bet types has indicative odds indicating a lowest payout per unit of the bet compared to payouts for others of the corpus of bet types; and outputting an identification of the determined bet type as having been determined to provide the lowest payout per bet unit.

In an example embodiment of the present invention, a computer program product for use with a wagering system comprises a computer-usable medium having computer-readable program code embodied in the medium for causing a computer to obtain indicative odds of each of a corpus of bet types; based on the obtained indicative odds, determine which of the corpus of bet types has indicative odds indicating a lowest payout per unit of the bet compared to payouts for others of the corpus of bet types; and output an identification of the determined bet type as having been determined to provide the lowest payout per bet unit.

BRIEF DESCRIPTION OF THE DRAWINGS

The accompanying drawings, which are incorporated in and from a part of the specification, illustrate embodiments of the present invention and, together with the description, serve to explain the principles of the invention.

DETAILED DESCRIPTION

Example embodiments of the present invention are directed to one or more processors, which may be implemented using conventional processing circuits or devices or combinations thereof, e.g., a central processing unit (CPU) of a personal computer (PC) or other workstation processor. The processor(s) may execute code provided, e.g., on a hardware computer-readable medium including a memory device, to perform one or more, e.g., all, of the methods described herein, alone or in combination. The one or more processors may be embodied in a server and/or user terminal. The user terminal may be embodied, for example, as a desktop, laptop, hand-held device, personal digital assistant (PDA), television set-top Internet appliance, mobile telephone, smart phone, iPod, iPhone, iPad, etc., or as a combination of one or more thereof. The memory device may include any conventional permanent and/or temporary memory circuits or combination thereof, a non-exhaustive list of which includes random access memory (RAM), read only memory (ROM), compact disks (CD), digital versatile disk (DVD), and magnetic tape. Such devices may be used, for example, for placing wagers, receiving wagers, allocating wagers, and/or allocating payouts for wagers.

An example embodiment of the present invention is directed to one or more hardware computer-readable media, e.g., as described above, having stored thereon instructions executable by a processor to perform various ones of the methods described herein, alone or in combination.

An example embodiment of the present invention is directed to a method, e.g., of a hardware component or machine, including transmitting instructions executable by a processor to perform various ones of the methods described herein, alone or in combination.

Figure 1:
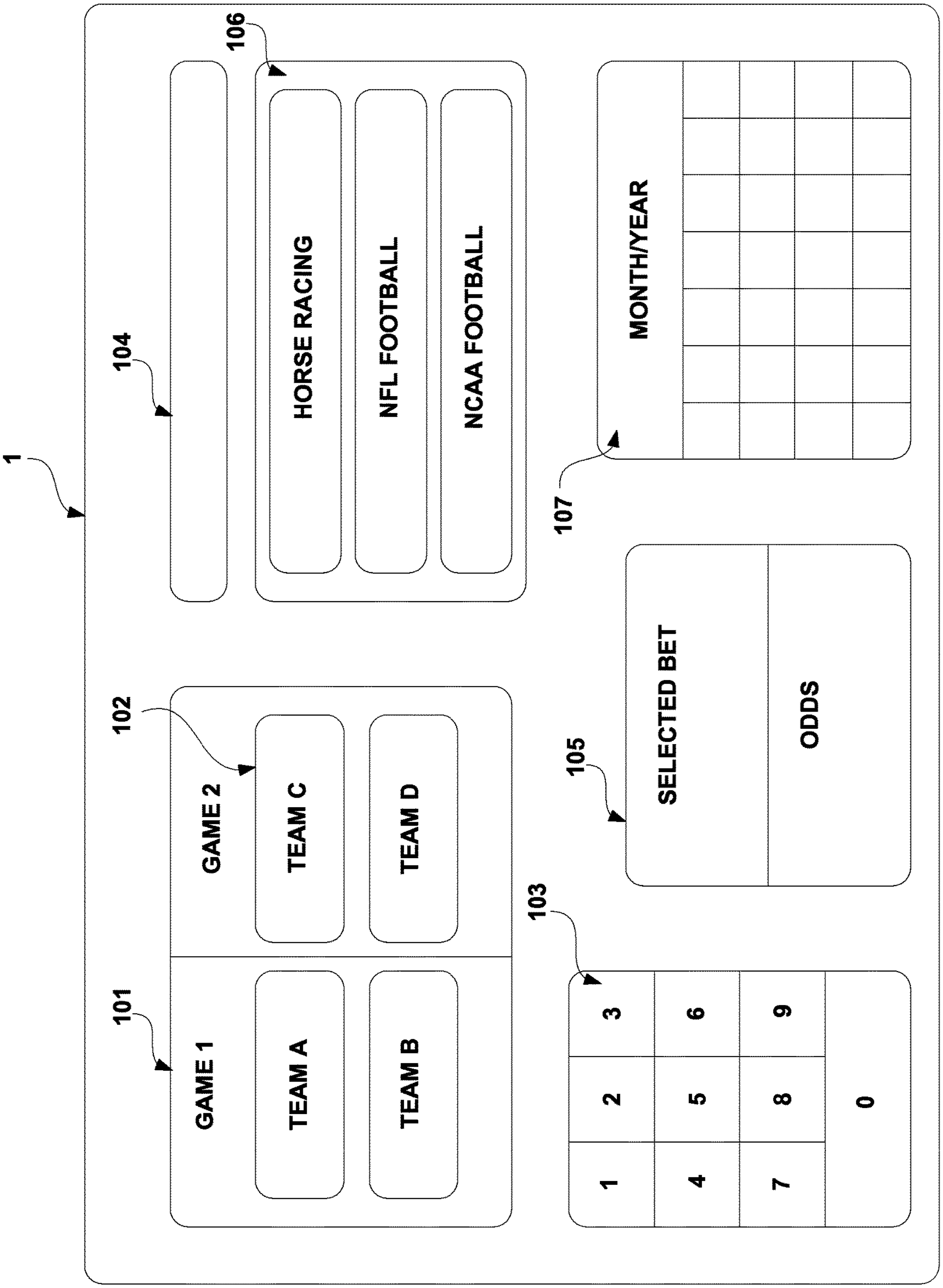
FIG. 1 shows an exemplary embodiment of a user interface display for entry of bet criteria and bet amounts, according to an example embodiment of the present invention.

FIG. 1 shows a user interface display 1 of a graphical user interface (GUI) provided by a processor for output on a display device, according to an example embodiment of the present invention. The user interface display 1 may include a text box 104, which may be populated, e.g., by entry of user-input via an alpha-numeric data entry device, such as a keyboard (not shown), for the entry of criteria for selecting a bet type. The user interface display 1 may further include selectable icons for the user to input criteria or desired bets. The selectable icons may include bet icons 102, which identify available bet types satisfying user-entered betting criteria. The bet icons 102 may be displayed in a results display 101. For each of the bet icons 102, responsive to selection of the respective bet icon 102, a processor may change the color of the respective bet icon 102, so as to indicate its selection. The selectable icons may also include numbers in a keypad 103, for entry of bet amounts or other numerical data. Alternatively or additionally, the user interface display 1 may include a text box for entry of the bet amount.

In an example embodiment, the user interface display 1 may include selectable bet amount icons corresponding to a plurality of commonly placed bet amounts, e.g., $5, $10, $25, $50, $75, $100, $200, $500, and to "other amount." Any of the icons corresponding to the commonly placed bet amounts may be selected for causing the processor to record a bet of the respective amount on the selected bet type. Responsive to selection of the "other amount" icon, the system may display the keypad 103 in place of or in addition to the display of the icons corresponding to the plurality of commonly placed bet amounts.

Further, each of the selectable bet icons 102 of the user interface display 1 may include a display of the currently determined indicative odds for that particular listed bet. For example, FIG. 1 shows an icon 102 for selecting a bet that Team A will win Game 1, an icon 102 for selecting a bet that Team B will win Game 1, an icon 102 for selecting a bet that Team C will win Game 2, and an icon 102 for selecting a bet that Team D will win Game 2. Those icons may further have displayed therein, respectively, the odds for Team A to win Game 1, the odds for Team B to win Game 2, the odds for Team C to win Game 2, and the odds for Team D to win Game 2, on which information the user may base a decision to select one (or more) of the bet types to which the icons correspond for placing a bet on the respective bet type.

In an example embodiment of the present invention, the user interface display 1 may further include a selected bet display graphic 105 that summarizes the user selections and provides information regarding the selections made by the user, e.g., via interaction with the user interface display 1. For example, the information may include the indicative odds of the currently selected bet type.

A computer processor may receive user-input betting criteria, input by the user via the user interface shown in FIG. 1. The criteria may include a particular range of indicative odds, including a maximum or a minimum indicative odds. The user first inputs this criteria into the user interface via, for example, the keypad 103 and/or the text box 104. For example, the keypad 103 and/or text box 104 may be used for input of filter criteria instead of for input of bet amounts. Alternatively, the keypad 103 and/or the text box 104 may initially be used for input of the filter criteria, and then subsequently used for input of a bet amount, once a bet type is selected, e.g., after selection of one of the icons 102.

Responsive to receipt of the user-input criteria, the computer processor may determine which bets satisfy this criteria, and output, via the user interface display 1, in the results display 101, an identification of the bets that satisfy the user's criteria. The output may be in the form of the bet icons 102, described above.

The system may be configured for receipt of criteria other than indicative odds. For example, the user may browse only one particular type of event for betting, such as a horse race or a football game. In this case, the user may enter the event type as search criteria into the text box 104. In the alternative or in addition, the user interface may include selectable categorical icons 106 for selecting certain types of bets, e.g., horse races or football games. The user may also want to limit the betting selection to a particular sporting league. For example, the user may want to only bet on football games played in the National Football League. In this case, the user may enter such search criteria into the text box 104 or via selection of appropriate categorical icons 106 related to particular leagues. In an example embodiment, the categorical icons 106 may be updated in response to selections of certain ones of the categorical icons 106. For example, in response to selecting a "Football" icon, the system may update to the categorical icons 106 to correspond to narrower criteria within the football category, e.g., icons for "NFL Football" and "NCAA Football."

The user may also want to limit the betting selection to those events occurring on a particular day or at a particular time. In this case, the user may enter such search criteria into the text box 104 and/or via selection within a calendar component 107 for selection of a particular date for the underlying event (and/or selection of a time via a clock component or other suitably appropriate time entry component).

Figure 2:
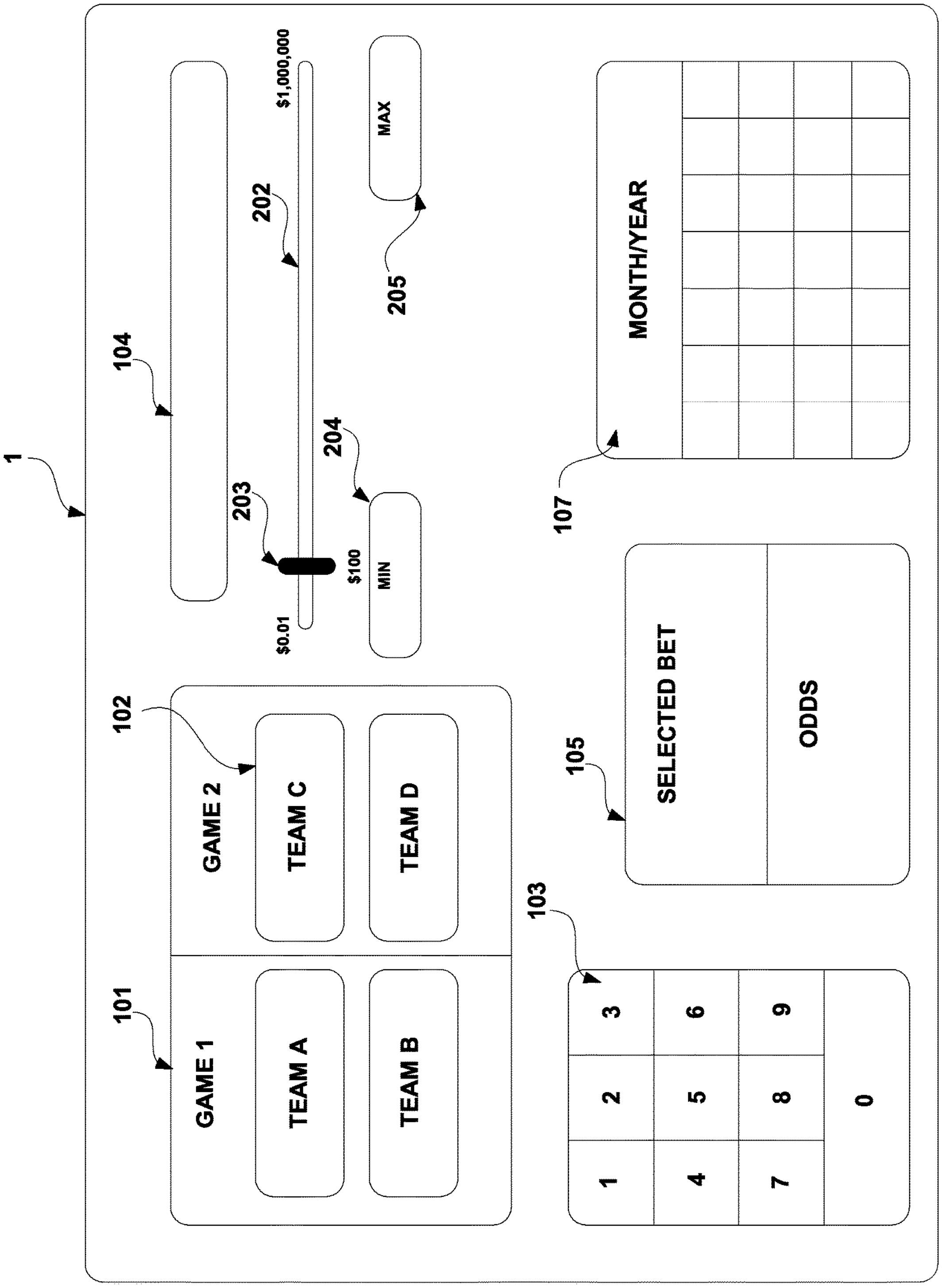
FIG. 2 shows a further exemplary embodiment of a user interface, including components for input of odds, according to an example embodiment of the present invention.

FIG. 2 shows a further exemplary embodiment of the user interface display 1 according to an example embodiment of the present invention. As shown in FIG. 2, the user may input betting criteria using a slider bar 202, the positions on the slider bar defining either a minimum, a maximum, or a range of the criteria. The user may drag the indicator 203 of the slider bar 202 to a position that represents a particular value of the criteria being entered. As the user drags the indicator 203 of the slider bar 202, the corresponding value of the criteria being entered may be displayed. When entering a range of values for the criteria, more than one indicator 203 may be used. For example, the criteria may relate to a score differential, a total score in a game, or the indicative odds, such that the displayed criteria is the amount of the payout per betting unit, as shown in FIG. 2, or such that the displayed criteria is a ratio representing the indicative odds. Alternatively, the user may enter specific amounts or ratios in the minimum criteria text box 204 or the maximum criteria text box 205. Alternatively, a single text box may be provided for entry of an exact amount or ratio. The results of the user's entry of the criteria will be displayed in the results display window 201.

Depending on the amounts being wagered on a particular event, the indicative odds on a particular event may change rapidly. Accordingly, in an example embodiment of the present invention, the system may update in real-time the display 1 with different bet types as the bet types matching the input indicative odds criteria changes, e.g., without requiring the user to refresh the display. In this manner, the user will be able to consider the most current information in deciding how to bet. Similarly, as the user slides the indicator(s) 203, the system may update the display 1 to display those bet types matching the revised criteria.

Figure 3:
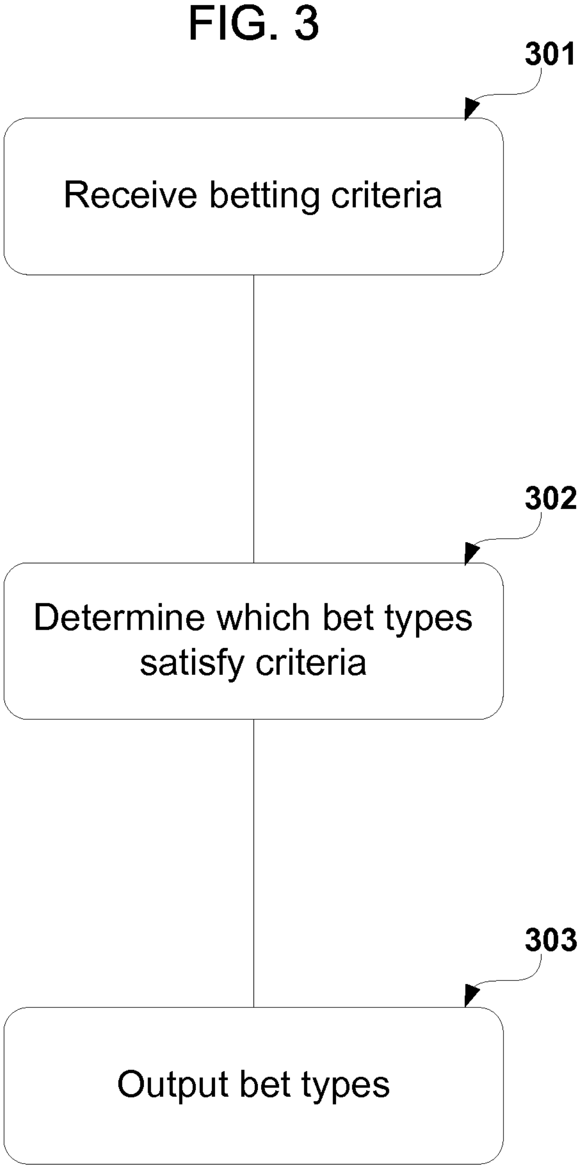
FIG. 3 is a flowchart illustrating a method for facilitating wagering, according to an example embodiment of the present invention.

FIG. 3 is a flowchart illustrating an example method for facilitating wagering. As shown in FIG. 3, the exemplary embodiment of the method for facilitating wagering of the present invention begins at step 301, with at least one computer processor receiving user-input betting criteria. The user of the computer processor of the present invention may input a wide variety of criteria. For example, the input criteria may include odds received prior to an end of a betting period in which bets are recordable on an event. The criteria may include minimum or maximum indicative odds, the type of sporting event on which the wager will be placed, or identification of a league of competitors in the event. The criteria may include a type of race, or characteristic of a participant in the race, e.g., the age, gender, or breed of horses running in the race. The criteria may include a location at which an event on which bets are placeable takes place, or an event time. The above-listed criteria are exemplary. Additionally, the criteria is not limited to any one criterion listed herein, and may include any combination of criteria. The received criteria may be input by interaction with a slider bar, as described with respect to FIG. 2, positions on the slider bar defining at least one of (a) a minimum of a metric, (b) a maximum of the metric, and (c) a range of the metric. The metric may specify, for example, a payout amount and/or odds.

Once the criteria is received at step 301, the method proceeds to step 302, with the at least one computer processor determining which of a corpus of bet types satisfy the criteria. The determination may be based on indicative odds calculated for the corpus of bet types calculated as though no more bets will be received during the betting period.

The method then proceeds to step 303, with the at least one computer processor outputting an identification of all of the determined bet types. The identification of the bet types may be output in a user interface including user-selectable controls for placing bets, as described with respect to FIGS. 1 and 2. Further, the user interface may be updated in real-time in response to changes in indicative odds, where the indicative odds are determined (a) during a betting period in which bets are placeable and (b) based on previously placed bets. Further, the user-selectable controls may provide the identification of the bet types, each of the user-selectable controls corresponding to one of the bet types and being user-selectable for placing a bet of the respectively identified bet type.

Figure 4:
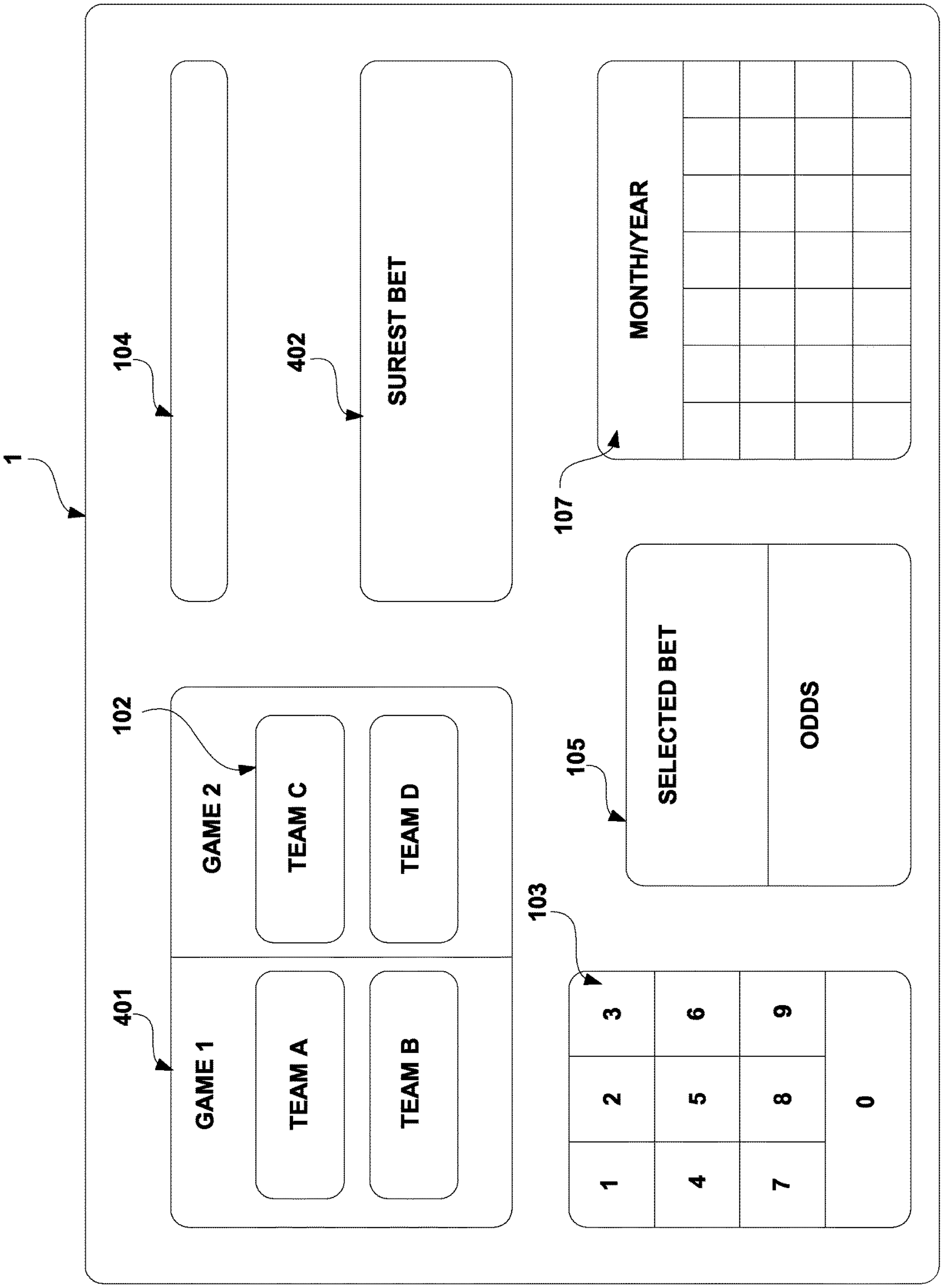
FIG. 4 shows a further exemplary embodiment of a user interface according to an example embodiment of the present invention.

FIG. 4 shows a further exemplary embodiment of the user interface display 1 according to an example embodiment of the present invention. As shown in FIG. 4, the user interface display 1 may further include a surest bet icon 402. The surest bet is defined, for the purposes of the present invention, as the bet with indicative odds having the lowest payout per unit of the bet, as compared to the payouts of the other bets of the collection of bets tracked by the system. The collection of bets tracked by the system may be displayed in the collection display 401.

Thus, a computer processor may calculate the indicative odds of each of a collection of bets tracked by the system. As noted above, indicative odds are calculated based on the assumption that no more bets will be received during the betting period. Such odds are indicative of the final odds that will be offered in the parimutuel wagering system, and may change before the end of the betting period. However, the indicative odds can provide information to a user of the parimutuel wagering system, which the user may find helpful in deciding which bet to place. Once calculated, the computer processor may determine which of the bets has indicative odds indicating the lowest payout per unit of the bet, compared to payouts for the other bets. Once this "surest bet" is determined, the computer processor may output the surest bet via the surest bet icon 402, as shown in FIG. 4. In an example embodiment of the present invention, the surest bet icon 402 is selectable, by the user, in the user interface display, so that the user can quickly and easily place the surest bet. For example, the user may select the surest bet icon 402, and then enter a bet amount. The system may then record placement of a bet of the entered bet amount on the surest bet type, in association with the user. For example, the surest bet type may be a bet that Team A will win Game 1, and the input amount may be $5. After selection of the surest bet icon 402, input of the $5 amount, and, for example, entry of a place bet instruction, e.g., by hitting the "return" key on a keyboard, or hitting a displayed "enter" or "place bet" button, the system may record, in association with the user, placement of a $5 bet on Team A winning Game 1.

While certain interface components are described with respect to the different example displays of FIGS. 1, 2, and 4, other combinations of the described components may be provided. For example, the collection display 401 and/or the surest bet icon 402 may be included in the displays of FIG. 1 or FIG. 2, and/or the odds indicator components of FIG. 2 may be included in the display of FIG. 1 or FIG. 4.

Figure 5:
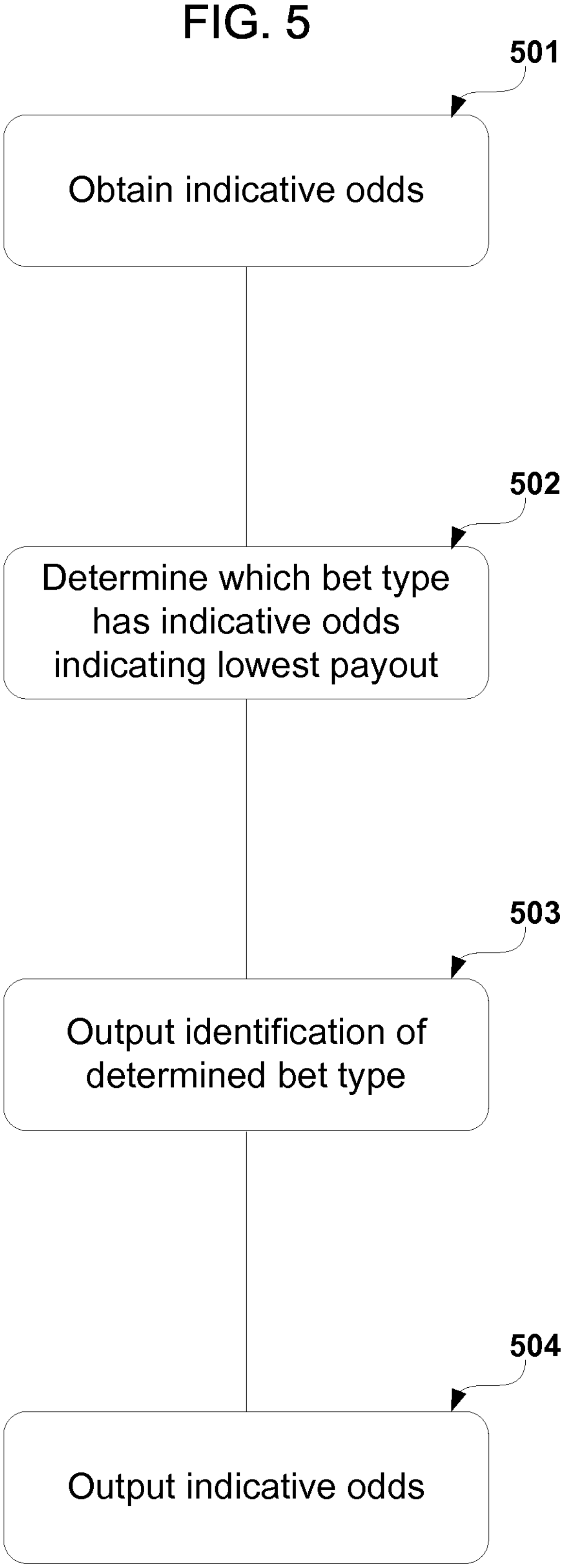
FIG. 5 is a flowchart illustrating a method for wagering, according to an example embodiment of the present invention.

FIG. 5 is a flowchart that illustrated an example method for wagering according to an example embodiment of the present invention. As shown in FIG. 5, the exemplary embodiment of the method for wagering of the present invention begins at step 501, with at least one computer processor obtaining indicative odds of each of a corpus of bet types. The indicative odds may be calculated based on previously placed bets, and the corpus of bet types may include bet types on sporting events played within a league of competitors, or bet types on events played on a selected date.

The method then proceeds to step 502, with the at least one computer processor determining, based on the obtained indicative odds of step 501, which of the corpus of bet types has indicative odds indicating a lowest payout per unit of the bet compared to payouts for others of the corpus of bet types.

The method then proceeds to step 503, with the at least one computer processor outputting an identification of the determined bet type as having been determined to provide the lowest payout per bet unit. The outputting of step 503 may be performed prior to a close of a betting window in which bets of the corpus of bet types are placeable on one or more underlying events. The identification of the determined bet type may be output in association with a user-selectable control for placing a bet of the identified bet type. Further, the identification may be output in a user interface, the bet type identified in the user interface as having been determined to provide the lowest payout per bet unit being updated in real-time in response to changes in indicative odds. Further still, the identification of the determined bet type may be user-selectable for placing a bet of the determined bet type.

The method may also proceed to step 504, with the at least one computer processor outputting the indicative odds of the determined bet type.

Figure 6:
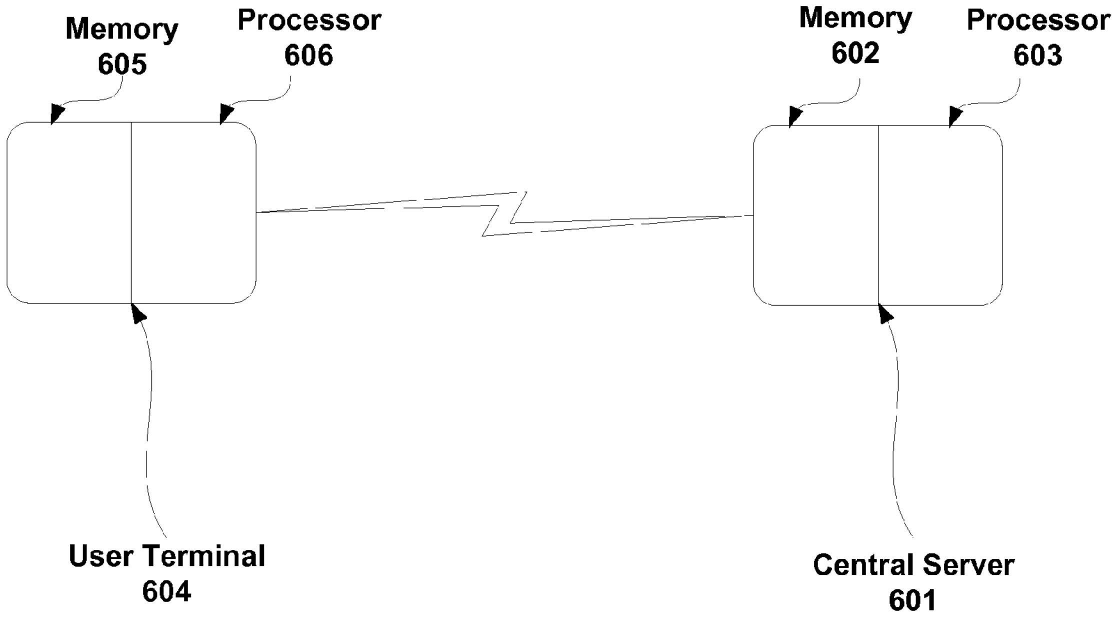
FIG. 6 shows a system according to an example embodiment of the present invention.

FIG. 6 shows a system according to an example embodiment of the present invention. The system of FIG. 6 includes at least one central server 601, capable of recording bets of a plurality of bet types place on one or more underlying events. Central server 601 includes memory 602 for recording the bets of a plurality of bet types place on one or more underlying events. The memory 602 may include any conventional permanent and/or temporary memory circuits or combination thereof, a non-exhaustive list of which includes random access memory (RAM), read only memory (ROM), compact disks (CD), digital versatile disk (DVD), and magnetic tape. Central server 601 further includes at least one computer processor 603, and memory 602 may store instructions executable by processor 603 for providing the user interfaces described in FIGS. 1, 2, and 4, and for communicating with at least one user terminal 604.

At least one user terminal 604, further included in the system, may be any type of human-machine interface known in the art, including a personal computer, a laptop computer, a hand-held or portable device such as a PDA, cellular telephone, smartphone, iPod, iPhone, iPad, etc. User terminal 604 may include memory 605, which may also include any conventional permanent and/or temporary memory circuits or combination thereof, a non-exhaustive list of which includes random access memory (RAM), read only memory (ROM), compact disks (CD), digital versatile disk (DVD), and magnetic tape. User terminal 603 may further include at least one computer processor 606. Memory 605 of user terminal 603 may store instructions executable by processor 606 for providing the user interfaces described in FIGS. 1, 2, and 4, and for communicating with the central server 601. The communication between user terminal 603 and central server 601 may include updates of information for outputting indicative odds and for placing bets.

Either of processors 603 and 606 may perform any of the method steps of the present invention. Processor 603 of central server 601 may determine indicative odds, for example, and communicate the determined indicative odds to the user terminal 604. Processor 606 of user terminal 604 may, for example, communicate only the bets placed by the user to the central server 601.

The above description is intended to be illustrative, and not restrictive. Those skilled in the art can appreciate from the foregoing description that the present invention may be implemented in a variety of forms. For example, certain steps described with the respect to the flowcharts may be implemented in a different sequence than that described or may be omitted. For example, steps 503 and 504 may be performed simultaneously or in a different order than that shown in FIG. 5. Those skilled in the art can further appreciate from the foregoing description that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented method for facilitating wagering, comprising performing the following by a computer processor of a user terminal that is in network communication with a server:

generating and outputting on a display device of the user terminal a user-interactive user interface that includes a slide bar control that includes a bar, a first indicator, and a second indicator, wherein the first and second indicators are each independently draggable along the bar, each position along the bar corresponds to a respective odds value, the value of a position to which the first indicator is user-dragged is set as a minimum odds value of odds for filter criteria, and the value of a position to which the second indicator is user-dragged is set as a maximum odds value for the filter criteria, thereby forming a range of odds values for the filter criteria;

responsive to the user-dragging of each of the first and second indicators:

determining which of a plurality of bet types the server has indicated is assigned respective indicative odds, prior to an end of a respective betting period in which bets are recordable on a respective event on which bets of the respective bet type can be placed, that falls within the range of odds values; and based on the determined bet types, at least one of adding to the user interface and removing from the user interface at least one wager selection control of a corpus of wager selection controls; subsequent to setting of the range of odds values:

receiving from the server real-time updates of the respective odds for each of the plurality of bet types; and based on the real-time updates, continually, without a user-instructed refresh of the user interface, and in real-time response to the updates, adding to the user interface and removing from the user interface wager selection controls of the corpus of wager selection controls, as the bet types falling within the range of odds values changes by the real-time updates; and determining which of the plurality of bet types has indicative odds indicating a lowest payout per unit of the bet compared to payouts for others of the plurality of bet types;

wherein:

each of the wager selection controls included in the user interface is user-selectable to select the respective bet type, to which the respective wager selection control corresponds, for placement of a wager in a wager pool; and the user interface further includes an identification of the determined bet type as having been determined to provide the lowest payout per bet unit as a selectable icon displayed distinctly from the any of the others of the plurality of bet types.

2. The method of claim 1, wherein the received odds are calculated for each of the corpus of bet types based on an assumption that no more bets will be received during the respective betting period.

3. The method of claim 1, wherein the criteria further includes a type of sporting event.

4. The method of claim 3, wherein the criteria further includes identification of a league of competitors.

5. The method of claim 1, wherein the criteria further includes a type of race.

6. The method of claim 5, wherein the criteria further includes an age of horses running in the race.

7. The method of claim 5, wherein the criteria further includes a gender of horses running in the race.

8. The method of claim 5, wherein the criteria further includes a breed of horses running in the race.

9. The method of claim 1, wherein the criteria further includes a location at which an event on which bets are placeable takes place.

10. The method of claim 1, wherein the criteria further includes an event time.

11. The method of claim 1, wherein the indicative odds are determined (a) during the betting period in which the respective bet types are placeable and (b) based on previously placed bets.

12. The method of claim 1, wherein the plurality of bet types includes bet types on sporting events played within a league of competitors.

13. The method of claim 1, wherein the plurality of bet types includes bet types on events played on a selected date.

14. The method of claim 1, further comprising:
outputting the indicative odds of the determined bet type.

15. The method of claim 1, wherein the identification of the determined bet type is output in association with a user-selectable control for placing a bet of the identified bet type.

16. The method of claim 15, wherein the bet type identified in the user interface as having been determined to provide the lowest payout per bet unit being updated in real-time in response to the updates in the indicative odds.

17. The method of claim 15, wherein the identification of the determined bet type is user-selectable for placing a bet of the determined bet type.

18. The method of claim 1, wherein a plurality of bet units are paid as premium for one or more bets of the determined bet type.

19. The method of claim 18, wherein the determined bet type is one of a plurality of types of bets that can be alternatively placed on an event, different outcomes of the event being required for consideration of different ones of the bet types as a winner.

20. The method of claim 1, further comprising:
displaying in the user interface a plurality of wager amount selection controls, wherein:
each of a subset of the wager amount selection controls corresponds to, and is selectable for inputting, a respective common bet amount for the wager to be placed in the wager pool; and
one of the wager amount selection controls is selectable for causing the processor to responsively remove the plurality of wager amount selection controls and display in their place a numeric keypad by user interaction with which a custom wager amount can be entered for the wager to be placed in the wager pool.

21. The method of claim 1, wherein the user interface further includes a plurality of bet type category selection controls that are each use-selectable for restricting the bet types to which the wager selection controls displayed in the user interface can correspond, and the method further comprises, responsive to selection of one of the bet type category selection controls, removing the plurality of bet type category selection controls from the user interface and displaying in their place a plurality of bet type sub-category selection controls that each correspond to a sub-category of the category to which the selected bet type category selection control corresponds and that are each also user-selectable for further restricting the bet types to which the wager selection controls displayed in the user interface can correspond.

22. A wagering system comprising:
a user terminal that is in network communication with a server and that includes a display device, an input device, and a computer processor, wherein the processor is configured to:
generate and output on the display device of the user terminal a user-interactive user interface that includes a slide bar control that includes a bar, a first indicator, and a second indicator, wherein the first and second indicators are each independently draggable along the bar by user manipulation of the input device, each position along the bar corresponds to a respective odds value, the value of a position to which the first indicator is user-dragged is set as a minimum odds value of odds for filter criteria, and the value of a position to which the second indicator is user-dragged is set as a maximum odds value for the filter criteria, thereby forming a range of odds values for the filter criteria;
responsive to the user-dragging of each of the first and second indicators:
determine which of a plurality of bet types the server has indicated is assigned respective indicative odds, prior to an end of a respective betting period in which bets are recordable on a respective event on which bets of the respective bet type can be placed, that falls within the range of odds values; and
based on the determined bet types, at least one of add to the user interface and remove from the user interface at least one wager selection control of a corpus of wager selection controls; subsequent to setting of the range of odds values:
receive from the server real-time updates of the respective odds for each of the plurality of bet types; and
based on the real-time updates, continually, without a user-instructed refresh of the user interface, and in real-time response to the updates, add to the user interface and remove from the user interface wager selection controls of the corpus of wager selection controls, as the bet types falling within the range of odds values changes by the real-time updates; and
determine which of the plurality of bet types has indicative odds indicating a lowest payout per unit of the bet compared to payouts for others of the plurality of bet types;
wherein:
each of the wager selection controls included in the user interface is user-selectable using the input device to select the respective bet type, to which the respective wager selection control corresponds, for placement of a wager in a wager pool; and
the user interface further includes an identification of the determined bet type as having been determined to provide the lowest payout per bet unit as a selectable icon displayed distinctly from the any of the others of the plurality of bet types.

23. A non-transitory computer-readable medium on which are stored instructions that are executable by a computer processor of a user terminal that is in network communication with a server, the instructions which, when executed by the processor, cause the processor to perform a method for facilitating wagering, the method comprising:

generating and outputting on a display device of the user terminal a user-interactive user interface that includes a slide bar control that includes a bar, a first indicator, and a second indicator, wherein the first and second indicators are each independently draggable along the bar, each position along the bar corresponds to a respective odds value, the value of a position to which the first indicator is user-dragged is set as a minimum odds value of odds for filter criteria, and the value of a position to which the second indicator is user-dragged is set as a maximum odds value for the filter criteria, thereby forming a range of odds values for the filter criteria;

responsive to the user-dragging of each of the first and second indicators:

determining which of a plurality of bet types the server has indicated is assigned respective indicative odds, prior to an end of a respective betting period in which bets are recordable on a respective event on which bets of the respective bet type can be placed, that falls within the range of odds values; and based on the determined bet types, at least one of adding to the user interface and removing from the user interface at least one wager selection control of a corpus of wager selection controls;

subsequent to setting of the range of odds values:

receiving from the server real-time updates of the respective odds for each of the plurality of bet types; and based on the real-time updates, continually, without a user-instructed refresh of the user interface, and in real-time response to the updates, adding to the user interface and removing from the user interface wager selection controls of the corpus of wager selection controls, as the bet types falling within the range of odds values changes by the real-time updates; and determining which of the plurality of bet types has indicative odds indicating a lowest payout per unit of the bet compared to payouts for others of the plurality of bet types;

wherein:

each of the wager selection controls included in the user interface is user-selectable to select the respective bet type, to which the respective wager selection control corresponds, for placement of a wager in a wager pool; and the user interface further includes an identification of the determined bet type as having been determined to provide the lowest payout per bet unit as a selectable icon displayed distinctly from the any of the others of the plurality of bet types.

* * * * *